United States Patent
Hampel et al.

(10) Patent No.: US 9,429,178 B2
(45) Date of Patent: Aug. 30, 2016

(54) WALL FASTENING, OR WALL OR CEILING HOOK, OR EYELET FOR A HOLLOW WALL, AND METHOD FOR FASTENING SAME

(71) Applicants: Lars Hampel, Düsseldorf (DE); Karsten Daniels, Düsseldorf (DE); Manfred Just, Düsseldorf (DE); Stefan Simon, Solingen (DE)

(72) Inventors: Lars Hampel, Düsseldorf (DE); Karsten Daniels, Düsseldorf (DE); Manfred Just, Düsseldorf (DE); Stefan Simon, Solingen (DE)

( * ) Notice: Subject to any disclaimer, the term of this patent is extended or adjusted under 35 U.S.C. 154(b) by 0 days.

(21) Appl. No.: 14/562,166

(22) Filed: Dec. 5, 2014

(65) Prior Publication Data

US 2015/0083878 A1 Mar. 26, 2015

Related U.S. Application Data

(63) Continuation of application No. PCT/EP2013/001656, filed on Jun. 5, 2013.

(30) Foreign Application Priority Data

Jun. 8, 2012 (DE) .................. 10 2012 011 410

(51) Int. Cl.
*F16B 45/00* (2006.01)
*F16B 13/04* (2006.01)
*F16B 2/24* (2006.01)
*A47G 1/20* (2006.01)
*F16B 43/00* (2006.01)

(52) U.S. Cl.
CPC ................ *F16B 13/04* (2013.01); *A47G 1/20* (2013.01); *F16B 2/248* (2013.01); *F16B 45/00* (2013.01); *F16B 43/00* (2013.01)

(58) Field of Classification Search
CPC .......... A47G 1/20; F16B 45/00; F16B 13/04; F16B 2/248
See application file for complete search history.

(56) References Cited

U.S. PATENT DOCUMENTS

| 3,312,442 A | 4/1967 | Moeller |
| 6,371,427 B1* | 4/2002 | Johnson .................. A47H 1/16 248/218.2 |
| 2008/0265123 A1* | 10/2008 | Repac .................... A47G 1/20 248/546 |
| 2008/0290231 A1 | 11/2008 | Repac |
| 2012/0056051 A1 | 3/2012 | Gold |

FOREIGN PATENT DOCUMENTS

| DE | 102010032707 A1 | 12/2011 |
| WO | WO 94/00702 A1 | 1/1994 |
| WO | WO 00/25030 A1 | 5/2000 |

OTHER PUBLICATIONS

International Search Report (PCT/ISA/210) mailed on Sep. 17, 2013, by the European Patent Office as the International Searching Authority for International Application No. PCT/EP2013/001656.

* cited by examiner

*Primary Examiner* — Amy Sterling
(74) *Attorney, Agent, or Firm* — Buchanan Ingersoll & Rooney PC

(57) ABSTRACT

A wall fastening is disclosed for a hollow wall, which includes a first section forming a hook configured to remain in front of the hollow wall and a second section which extends through a bore in the hollow wall and configured to fasten behind the hollow wall. The second section is bent, after insertion, in a final installation position, such that a tip at an end of a final section of the second section presses against a rear side of the hollow wall at a lateral distance, with a definable radius, from the bore in the hollow wall.

22 Claims, 5 Drawing Sheets

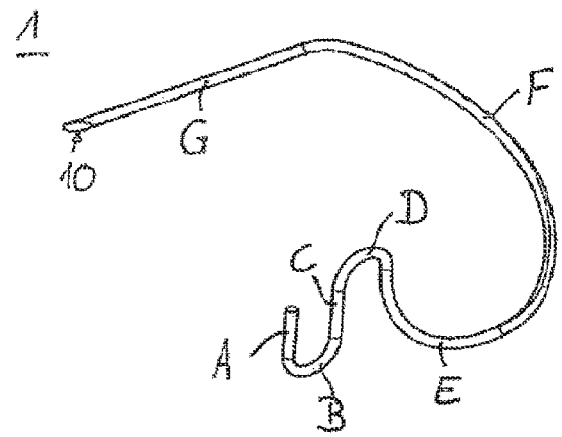
Fig. 1 (a)
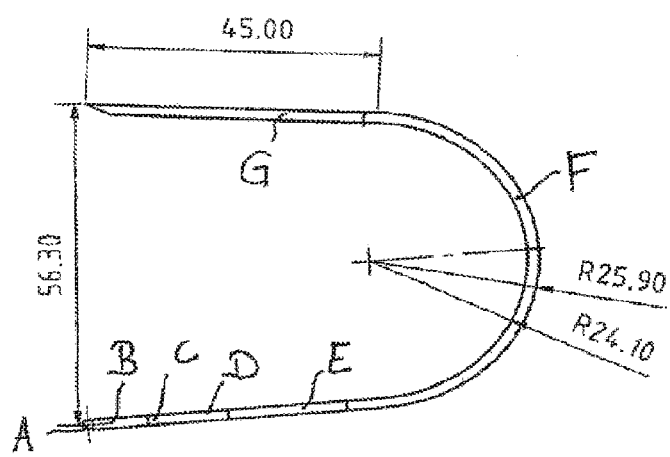
Fig. 1 (b)
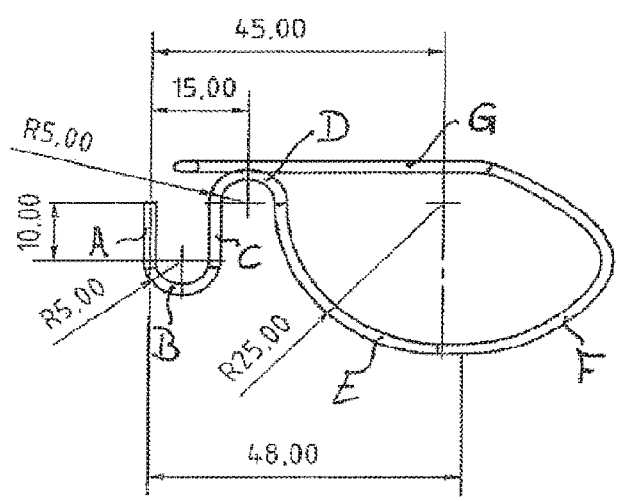
Fig. 1 (c)
Fig. 1

WALL FASTENING, OR WALL OR CEILING HOOK, OR EYELET FOR A HOLLOW WALL, AND METHOD FOR FASTENING SAME

RELATED APPLICATION(S)

This application claims priority as a continuation application under 35 U.S.C. §120 to PCT/EP2013/001656, which was filed as an International Application on Jun. 5, 2013 designating the U.S., and which claims priority to German Application 10 2012 011 410.9 filed in Germany on Jun. 8, 2012. The entire contents of these applications are hereby incorporated by reference in their entireties

FIELD

The disclosure relates to a wall fastening or wall hook for a hollow wall, and to a method for producing a wall fastening or a fastening hook or eyelet on or in a cavity wall.

BACKGROUND INFORMATION

Wall fastenings can include wall or ceiling hooks, which can be pushed with a rear section into a wall or a bore in a wall, a hollow wall or cavity wall, and a hook element, to which a decorative object, a useful or functional object or a piece of furniture can be fastened, which then remains in front of the wall. Wall fastenings and wall hooks for use in hollow walls or cavity walls are, for example, but not exclusively known in conjunction with interior construction boards or gypsum plasterboards. The boards can be used in interior finishing for dividing rooms, for example. Cavity dowels as such, and fastening systems with cavity dowels are known.

After a bore has been produced, a dowel, in which, for example, a screw hook is then screwed, is inserted. When the screw hook reaches the screw-in position of the screw hook in terms of depth, a further rotation can lead to the rear end of the dowel being deformed by the screw thread in a manner such that the rear end is thickened or deformed to such an extent that the thickening or deformation engages behind the bore behind the cavity wall or the gypsum plasterboard on a surface which is larger than the dowel diameter. Stable wall fastenings can thus be produced on gypsum plasterboard.

However, the installation is not straightforward because the dowel, which is being pressed into gypsum plasterboard since the dowel can rotate while being screwed in, and in the final installation state, the dowel can be virtually completely deformed.

Known fastenings solutions include large fastening flanges, which can distribute the holding forces over as large an area as possible on a gypsum plasterboard. One example in this respect is provided by DE 10 2010 032 707 A1, which uses a heavy-duty dowel for the hollow wall or hollow wall installation. A supporting ring and a sealing washer corresponding to the supporting ring, which can accommodate a threaded stem, can be used for distributing forces.

Known hollow wall or cavity wall installation systems can also include a large number of complicated installation steps.

SUMMARY

A wall fastening for a hollow wall is disclosed, the wall fastening comprising: a first section forming a hook configured to remain in front of the hollow wall; and a second section configured to extend through a bore in a hollow wall and configured to fasten behind the hollow wall, wherein the second section is configured to bend, after insertion, in a final installation position, such that a tip at an end of a final section of the second section will press against a rear side of the hollow wall at a lateral distance, with a definable radius, from a bore in the hollow wall.

A method is also disclosed for producing a wall fastening on or in a cavity wall, the method comprising: introducing a hole into the cavity wall; passing a wall fastening element through the hole in the cavity wall, the wall fastening element including a first section forming a hook, which remains in front of the cavity wall, and a second section which extends through the cavity wall through the hole and fastens in or behind the cavity wall, wherein the second section completely passes through the hole and is bent in such a manner that, after insertion, in a final installation position, a tip at an end of the second section presses against a rear side of the cavity wall at a lateral distance, with a definable radius, from the hole.

BRIEF DESCRIPTION OF THE DRAWINGS

The subject matter of the disclosure will be explained in more detail in the following text with reference to exemplary embodiments, which are illustrated in the attached drawings, in which:

FIGS. 1(a)-(c) show an exemplary wall hook or wall fastening element in a perspective view, in a top view and a side view, respectively;

DETAILED DESCRIPTION

Figure 2:
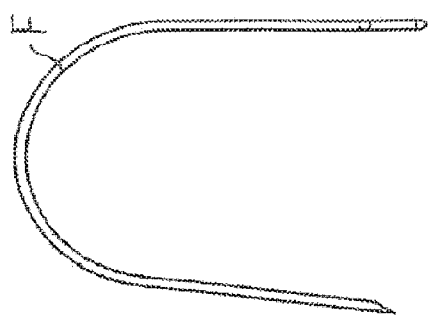
FIGS. 2(a)-(d) show an exemplary wall hook or wall fastening element in the final installation position.
Figure 2:
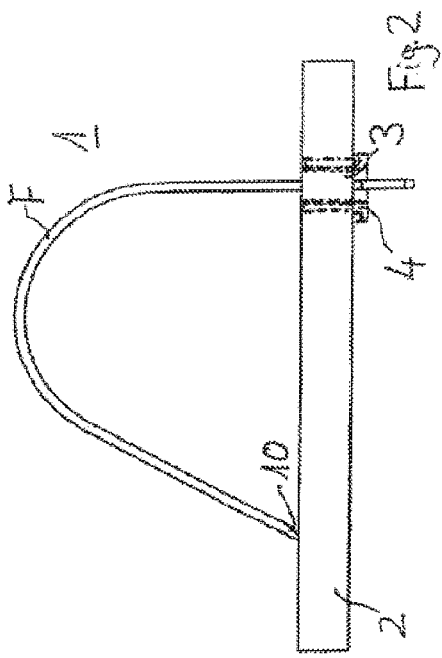
Figure 2:
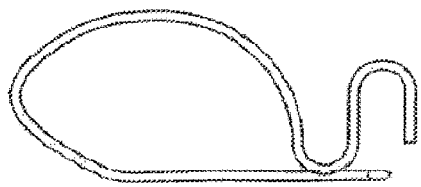
Figure 2:
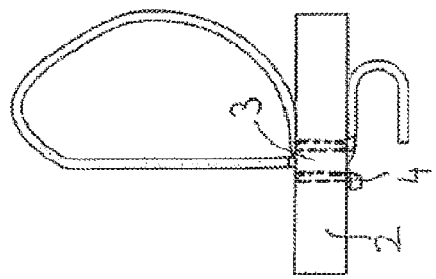

In accordance with an exemplary embodiment, a fastening method and a wall hook or a wall fastening means is disclosed, wherein the installation can be considerably simplified and can be produced by relatively unskilled individuals.

With regard to a wall fastening or a wall hook, in accordance with an exemplary embodiment, the disclosure includes a second (or further) sections E, F, G can be bent in such a manner that, after insertion, in the final installation position, the second or further section can press with a tip present at the end of the final section G against the rear side of the hollow wall at a lateral distance, with a definable radius, from the bore or the hole in the hollow wall.

In accordance with an exemplary embodiment, a different fastening concept is disclosed, wherein only a single (or one) hole needs to be drilled into the cavity wall or the hollow wall. For example, in the case of soft gypsum plasterboards, the hole can be produced with a punching tool, for example, without a hand drill.

In accordance with an exemplary embodiment, the fastening element or the wall hook, which is bent into a plurality of curves, is first inserted by the rear end through the previously drilled or manufactured hole in the hollow wall and, by way of insertion with simultaneous rotation, is pushed through the hole in the hollow wall until the inserted rear end comes to bear on the rear side of the hollow wall. The front S bend section of the wall hook, for example, is then brought into position in that the hook forms an upwardly open opening into which the load can be hooked. The curved sections of the wall hook or of the wall fastening element can be dimensioned in such a manner that the pointed rear end which comes to rest against the rear side of the hollow wall can exert an elastic restoring force on the front hook section, which can project out of the front side of the hollow wall, which can produce a bracing tilting moment. Owing to the fact that the rear end is pointed, the rear end can slightly carve into the rear side of the hollow wall and forms a reference point which is secured against displacement and is at a distance, with a defined radius, from the drill hole, and therefore introduces the virtually locking tilting moment via the radius into the fastening element with a corresponding lever action. As a result, an effective and simple securing in position can take place.

In accordance with an exemplary embodiment, a support structure which is arranged behind the hook and bears against the cavity wall from the front can be included in one of the first sections. The support structure can also reinforce and secure the inserted position of the fastening element in the drill hole from the front.

In accordance with an exemplary embodiment, a curved transition region can be provided between the first sections A to D and the second sections E to G, the transition region being bent in such a manner that, after the further sections E, F, G have been fully inserted, a clamping tilting moment can be produced against the wall fastening or the wall hook by linear displacement of the hook, which can keep the hook under tension in the final position of the hook in relation to the second section engaging behind the hook.

In accordance with an exemplary embodiment, a sleeve can be insertable into the hole, which hole can be premanufactured by drilling or punching, in the hollow wall and through which the hook is pushable by the second sections of the hook and can be held in the desired final position. In accordance with an exemplary embodiment, the sleeve can lead to an increase in the forces acting on the hollow wall locally at the drill hole after the wall hook is loaded.

In accordance with an exemplary embodiment, the sleeve can have a defined wall thickness in such a manner that via the load absorption forces of the wall fastening or wall hook, which has been brought into the desired final position, can be distributed over the outer circumferential surface of the sleeve. By the use of different sleeves with a different wall thickness, the wall fastening can be adapted to the material of the hollow wall with regard to the desired load by the corresponding choice of the respectively used sleeve. In accordance with an exemplary embodiment, the greater the wall thickness of the sleeve, the larger is the outer lateral surface and the distribution of forces in this regard.

In accordance with an exemplary embodiment, the sleeve is not a dowel, since the sleeve itself does not undergo any twisting or expansion by insertion of the wall hook, but merely brings about the distribution of forces and the protection of the drill hole from tearing.

In accordance with an exemplary embodiment, the sleeve can be provided on the outer circumference with a thread which can be self-cutting by rotation into the cavity wall about the longitudinal axis of the sleeve and/or with a flat cutting fixing element which can be arranged on the side of the hook or the eyelet and, upon installation, can be fixed in a manner cutting into the front surface of the hollow wall. Thus, a type of integrally formed washer with downwardly protruding teeth can be provided.

In accordance with an exemplary embodiment, an additional securing of the position of the sleeve can therefore be undertaken.

However, in accordance with an exemplary embodiment, with the aid of the sleeve, the drill hole can be produce in one-step without a separate drill having to be used. In such a case, for example, the installation can also be virtually free from dust.

In accordance with an exemplary embodiment, a threaded section can be arranged instead of a hook at the front end of the first section in such a manner that a fastening flange or a fastening element can be screwable onto the threaded section.

In accordance with an exemplary embodiment, the sections E-F-G form a rear wall element, and the wall fastening or the wall hook can have at least two separate rear wall elements, of which at least one is elastically deformable.

In accordance with an exemplary embodiment, section C of the hook can be divided into two bending regions C' and C", wherein the first section C' undertakes a bend through 42° with respect to the region B located before section C', the section merging with a further bend in the region of, for example, approximately 130° into a further section C". The following section in turn can have an opposed bend in this plane of projection, wherein the limbs of the enclosed angle describe an angle of, for example, approximately 153°.

In accordance with an exemplary embodiment, by means of this profile of the sections which, according to the disclosure, can have a bending profile which can be three-dimensional and is not flat, a significantly greater stress can also be applied to the wall hook, for example, when the wall hook is fixed in the desired position in the hollow wall.

In accordance with an exemplary embodiment, at least two wall fastenings or wall hooks or ceiling hooks can be fastenable in a manner lying next to one another by means of a fixing disk. The fixing disk can be placeable onto the hollow construction wall and the wall hooks being pushable through slots in the fixing disk, wherein in each case two slots are placed offset from the edge or a side line of the fixing disk parallel in each case to a center line or to a diameter line of the fixing disk in such a manner that, by rotation of the fixing disk, the wall fastenings or wall hooks or ceiling hooks can be braced toward one another.

In accordance with an exemplary embodiment, at least two wall fastenings or wall or ceiling hooks can be fixed next to one another in the hollow wall. For example, by means of the three-dimensional curvature according to the disclosure of the wire-shaped hook section pushed into the hollow wall, the hook section can grip in a locking manner against the rear side of the hollow wall. In addition, by means of the use of two hooks, which can be positioned next to each other and can be pushed through the hollow wall or through holes provided in the hollow wall, the hooks expand by the respective, rear, wire-shaped sections thereof or pointed end of same over a large radius of the hole in the hollow wall behind the latter. In accordance with an exemplary embodiment, by means of the use of at least two hooks, the hooks can be positioned in such a manner that the pointed ends of the wire-shaped sections can be placed away from one another as far as possible on the rear side of the hollow wall, which can have the effect that an extremely large, effective fastening lever can be brought about, and the holding forces, which can be applied subsequently to the hook or the hooks can be distributed over a quite considerably larger area of the hollow wall than in the case with a dowel. For example, relatively heavy loadings and strong holding forces can be achieved even in the case of hollow walls. For example, even heavy items of furniture or cupboards can be held on a hollow wall, for example, a gypsum plaster wall, because the loading forces can be distributed over a large wall area.

In accordance with an exemplary embodiment, the slot length can be smaller than half the diameter or half the edge length of the fixing disk, for example, the slots end within the fixing disk. Thus, the fixing disk is not continuous.

In accordance with an exemplary embodiment, at least two slots can be provided in the fixing disk, each of the slots having at least one further slot section, which can branch off approximately perpendicularly from each slot and ends within the surface of the fixing disk. Locking positions can be produced by the slot sections branching off in an angular manner, and therefore the fixing disk, which can be rotated into the locking position, and cannot automatically rotate back.

In order to be able to realize diverse hook distances with one and the same fixing disk, in accordance with an exemplary embodiment, at least two parallel, branching slot sections can be provided in each slot.

In accordance with an exemplary embodiment, the fixing disk can have additional bores for receiving pins fixing the rotational position, or further wall or ceiling hooks. For example, the fixing disk can be locked in such a manner that even rotating-back deformation can torque because of large loadings, which cannot rotate the fixing disk back out of the locking position.

In accordance with an exemplary embodiment, a method is disclosed, which includes a second section which is completely passed through the hole, which can be bent in such a manner that, after insertion, in the final installation position, the second section presses with a tip present at the end of the second section against the rear side of the cavity wall at a lateral distance, with a definable radius, from the hole.

In accordance with an exemplary embodiment, the method according to the disclosure, the insertion movement of the wall fastening element or of the hook can be restricted by a support element, which can be arranged in the transition region between first and second sections of the wall fastening element or of the hook, in such a manner that, when the support element is in contact with the front wall of the cavity wall, the hook is locked in a final position.

In accordance with an exemplary embodiment, instead of a wall hook, a threaded stem can be provided at the front end of the wall fastening element, and wherein a flange element is screwable onto the threaded stem after the insertion of the stem into the hole in the hollow wall, which can be performed with or without use of the additional sleeve.

In accordance with an exemplary embodiment, a capsule filled with hard foam or construction foam or adhesive can be inserted into the premanufactured hole before insertion of the wall fastening, and, the with insertion of the wall fastening, the capsule can be pierced, and the wall fastening can be additionally secured in the final installation position.

FIG. 1(a) shows a perspective view of the wall hook or wall fastening element 1 according to an exemplary embodiment. The hook or wall fastening element 1 can include, for example, the part remaining in front of the hollow wall, for example, the actual hook, consists of a U bend, consisting of the sections A, B and C. In the final installation position, the bent-back section D can extend (or run) virtually exclusively through the drill hole in the hollow wall in the illustration, which is also shown in FIGS. 2(a)-(d). The adjoining section E contains a half bend back and a lateral bending, and therefore the bend does not extend in a plane, but rather three-dimensionally, which is adjoined, by section F, by a long bend, which forms the distance of the adjoining final section G from the drill hole in the hollow wall. In accordance with an exemplary embodiment, the end of the section G can be pointed.

FIG. 1(b) shows the top view of the wall hook or the wall fastening element 1. Exemplary dimensions and radii for an exemplary embodiment are also indicated here. The details selected there are in millimeters. The bend profile of the wall hook or the wall fastening element 1 can be seen in the top view projection. By contrast, FIG. 1(c) shows the projection in a side view including the three-dimensional profile of the bends. Section D, which is illustrated in FIG. 1(c) runs through the drill hole in the hollow wall. In accordance with an exemplary embodiment, the drill hole should be selected with respect to the thickness of the hook in such a manner that the bend of the section D is also accommodated.

FIG. 2(a) shows the side view of the wall hook on the left, and FIG. 2(b) shows the top view of the wall hook. FIGS. 2(c)-(d) show the final fitted position after the hook has been pushed through the hole 3 in the hollow wall, in the correspondingly identical views as in FIGS. 2(a)-(b), respectively.

In accordance with an exemplary embodiment, as seen in the bottom image part on the right, the bend opens further in the section, which means that the fitted position and pre-bending of the wall hook or of the wall fastening element in section F and G is selected in such a manner that the fitted position itself is mechanically bracing, and the pointed end 10 carves into the rear side of the hollow wall in a position-fixing manner.

The top of the left image part again shows the starting shape of the wall hook or fastening element before insertion into the hole in the hollow wall.

At the bottom on the left, the final installation position is again shown in a side view. The position-securing bracing of the hook in the hollow wall is also visible here.

In accordance with an exemplary embodiment, the installation procedure can include once the hole is present in the hollow wall, the fastening element 1 can be positioned in such a manner that the pointed end 10 of the section G pushes through the drill hole. The wall hook can be simultaneously rotated and pushed in a manner following the bend until also the sections F and E (as shown in FIGS. 1(a)-(c)) and through the hole 3 and then the section D is pushed into the hole 3 in the hollow wall. In the final installation position, only the section D is placed in the hole in the hollow wall. The sections A, B and C remain in front of the hollow wall 2, for example, also in front of the hole 3 in the hollow wall, and the sections E, F and G remain behind the hole 3 in the hollow wall 2.

For reinforcement purposes, a force-distributing sleeve 4 can also be inserted into the hole 2 in the hollow wall 2, through which sleeve the hook or the fastening element 1 is pushed in the above-described manner and locked.

In accordance with an exemplary embodiment, the bending extent or the bending radius in section D can be defined by the thickness of the hollow wall.

As shown in the illustrations, for the corresponding insertability of the hook 1 through the hole in the hollow wall, the bending radii of the individual sections become successively smaller from the point 10 as far as section D, which can make it easier to insert the hook through the hole in the hollow wall or the hole 3 with sleeve 4 in the hollow wall 2.

In accordance with an exemplary embodiment, the sleeve can also be provided on the outside with a self-cutting thread such that a hole does not have to be drilled, and instead the sleeve simultaneously cuts a hole.

Thus, the installation can be considerably more straightforward and effective.

However, a type of toothed ring disc can additionally also be provided, the toothed ring disc being additionally molded on or inserted at the same time in order additionally to secure the wall fastening.

Furthermore, the adhesive capsule or construction foam capsule already described above can also be inserted beforehand into the premanufactured hole and can then be pierced when the wall fastening is pushed through and additionally secures the installation site by adhesive bonding.

In accordance with an exemplary embodiment, the section which engages behind the hook or fastening element 1, can be a multi-part design at the same time such that two or more curved, wire-like structures expand behind the wall and each of the structures in each case cut into and are secured in the rear side of the hollow wall.

Figure 3:
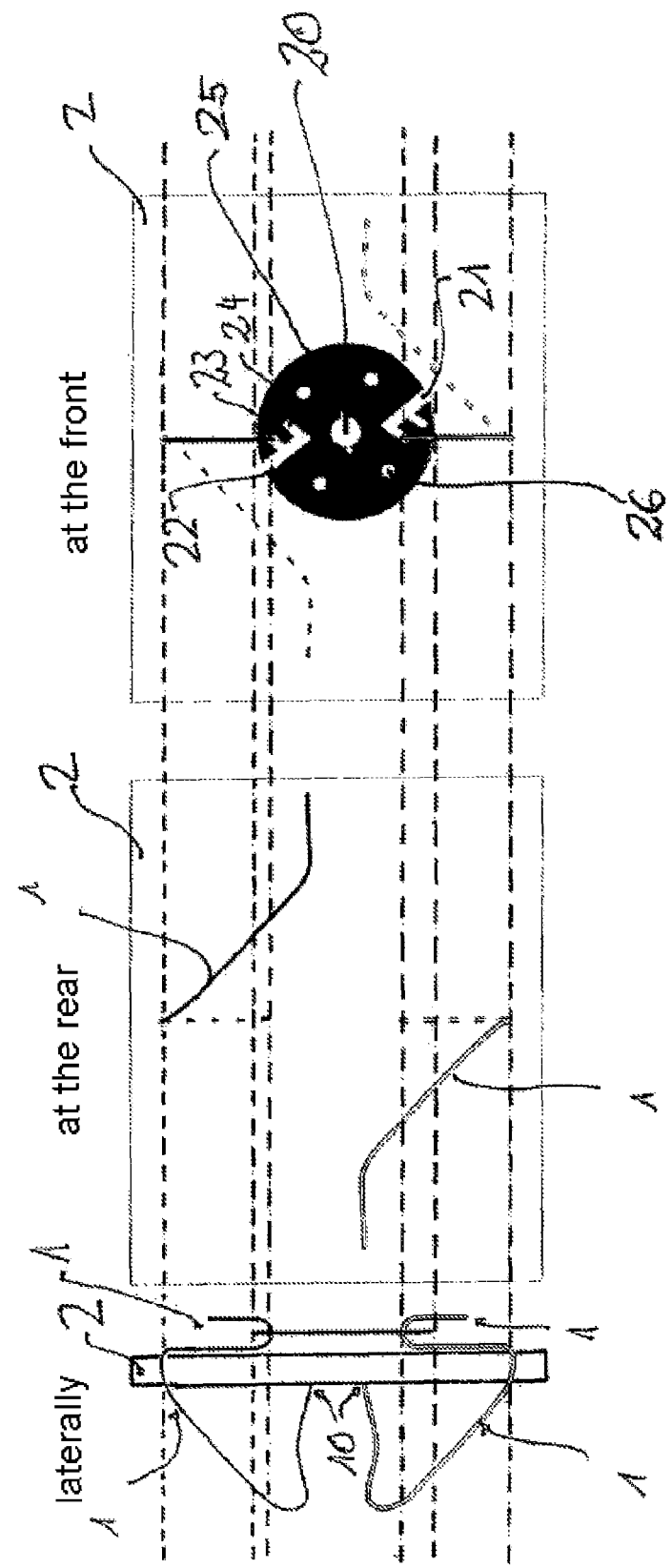
FIG. 3 shows the exemplary wall hook arrangement with fixing disk.

FIG. 3 shows, in three image parts, an exemplary embodiment of the disclosure, in which two wall or ceiling hooks of the type mentioned above can be driven next to each other through a wall by means of a fixing disk and can be subsequently braced in such a manner that the hooks can be pulled toward each other. In accordance with an exemplary embodiment, the hooks can be positioned in slots of the fixing disk. For example, a slight rotation of the fixing disk can lead to the hooks being subjected to a force, which can act toward each other and braces the hooks.

In the left image of FIG. 3, a side view (section through the hollow wall), the hooks are pushed through the hollow wall (gypsum plaster wall) and are secured with the rear, pointed end thereof behind the wall. The fixing disk can hold the hooks in a secure, braced position on the side located in front of the wall.

In the middle image part of FIG. 3, a top view of the rear side of the hollow wall shows how the three-dimensional, wire-shaped profile of the hooks can be positioned behind the hollow wall. As shown, the two hook profiles are in each case spread away from the other in the opposite direction. In accordance with an exemplary embodiment, the pointed ends of those ends of the hooks, which are positioned behind the hollow wall can be supported at a maximum possible distance from the hole or drill hole through which the hooks run through the hollow wall to the hollow wall rear side, which can produce a large effective lever for fixing purposes. Accordingly, the loading forces can be absorbed by the hooks can also be extensively distributed over a significantly larger hollow wall area.

In accordance with an exemplary embodiment, with this fastening technique as disclosed herein, considerably larger loadings can be supported on hollow walls.

The right image of FIG. 3 shows the view from the front onto the hollow wall, for example, the location where the hooks for the suspension of objects can be located in front of the wall.

It can furthermore be seen that the slots are opposite one another, but are not aligned with a center line (diameter line), but rather are offset in parallel thereto, which can result in a bracing force also occurring when the fixing disk is rotated. In accordance with an exemplary embodiment, in order to secure the fixing against rotating back, further side slots branch off from the slots at an angle of, for example, approximately 90°, can be used such that the position of the hooks can be secured.

In accordance with an exemplary embodiment, a further securing against rotation back can be provided by further holes through which securing pins can be inserted into the hollow wall.

Figure 4:
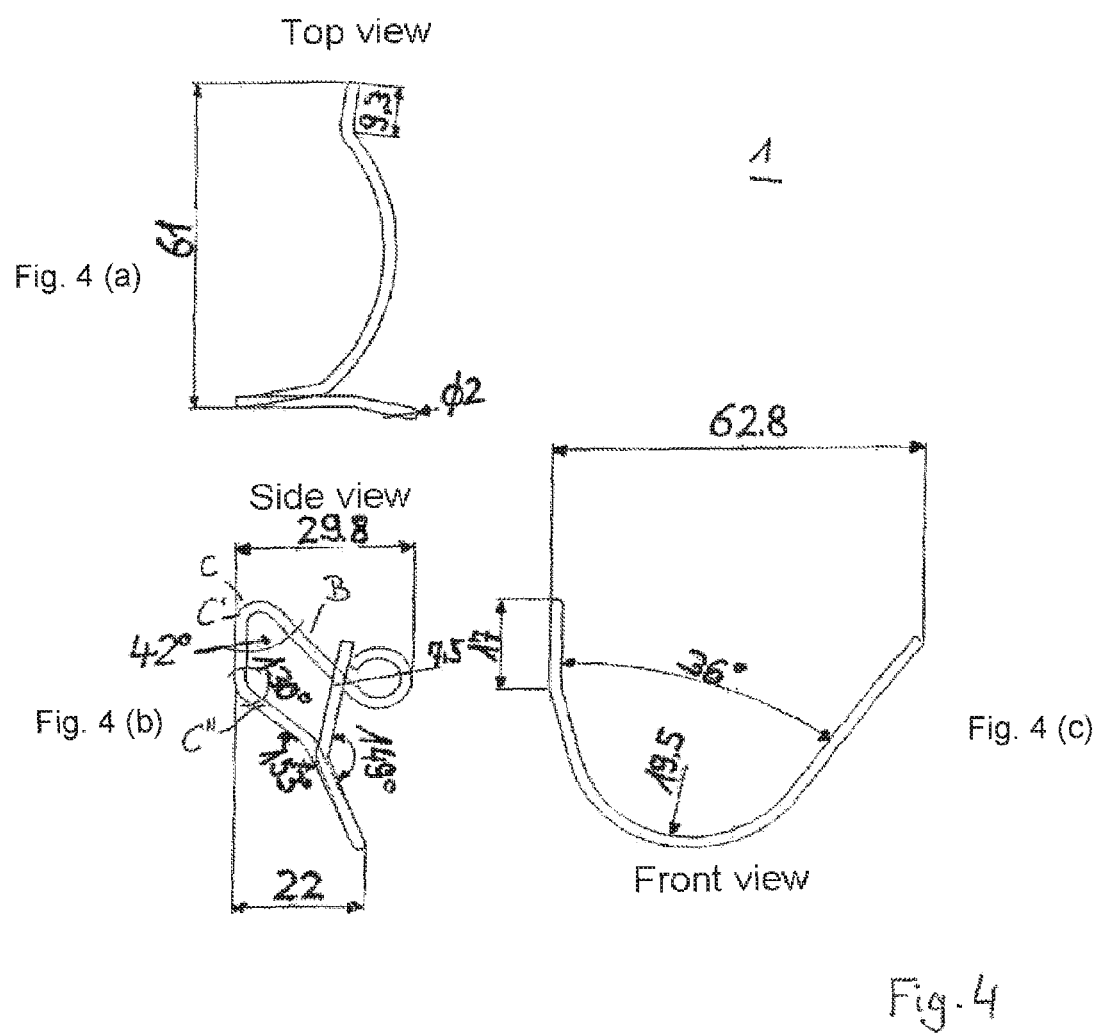
FIGS. 4(a)-(c) show an exemplary wall hook in accordance with an exemplary embodiment.

FIGS. 4(a)-(c) show a further possibility of configuring a hook shape in comparison to FIGS. 1(a)-(c) and FIGS. 2(a)-(d). In addition to the sections of the hook according to FIGS. 1(a)-(c) and FIGS. 2(a)-(d), section C in the exemplary embodiment of FIGS. 4(a)-(c) can have a different profile. For example, the angle profiles can be based on a view in a lateral plane of projection (side view) of the wall or ceiling hook.

In accordance with an exemplary embodiment, the difference is that section C does not undertake a bend through an angle of, for example, 180°, but instead the section C is divided into two bending sections C' and C", wherein the first section C' undertakes a bend, for example, of about 42° with respect to the region B located before C', the section with a further bend in the region of, for example, approximately 130° into a further section. The following section to C" in turn can have an opposite bend in this plane of projection, wherein the limbs of the enclosed angle describe an angle of, for example, approximately 153°. In accordance with an exemplary embodiment, the section, analogously to the section F according to FIGS. 1(a)-(c), can be bent once again in the plane of projection such that the limbs enclose an angle of, for example, approximately 149°.

In FIG. 4(c), an illustration of same hook is an illustration of the projection in a front view (view from the front).

Overall, an angle of, for example 36° can be produced in this illustration.

The image of FIG. 4(c) shows the illustration of the projection from above (top view).

For better understanding of the dimensions, the illustrations are all provided with dimensional details in millimeters and angle details in angle degrees in order to be able to place the spatial dimension thereof into proportion.

Furthermore, bores 26 through which rotation-preventing pins can be pushed are provided in the fixing disk. The centered bore, for example, the centered hole 25 in the fixing disk 20, can be equipped with a thread. The thread, for example, can then receive fastening screws of, for example, furniture parts. With this specific feature, the fixing disk can serve as a type of fastening flange for receiving further fastening means.

In this application, the hooks according to the disclosure then serve only for the inventive force-distributing fastening of the fixing disk to a hollow wall, in the manner of a fastening flange for receiving further fastening means.

Figure 5:
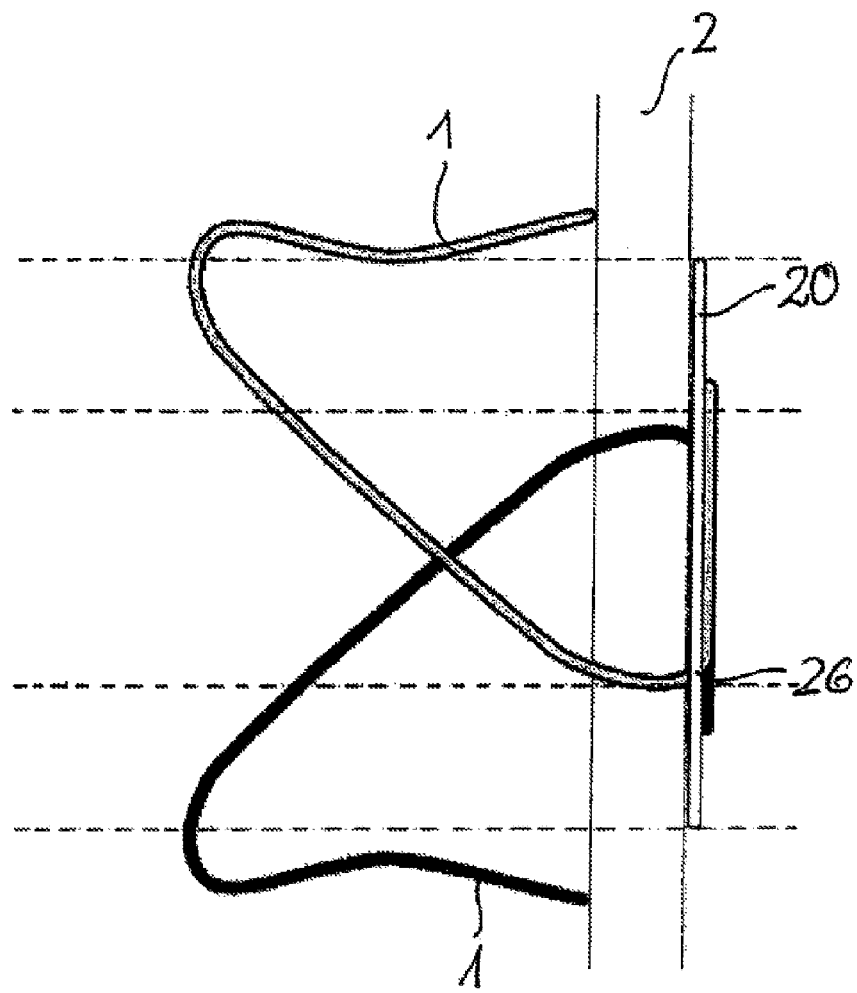
FIG. 5 shows an exemplary fixing disk with a wall hook as fixing element.

FIG. 5 shows a side view in which the fixing disk are not fastened by fixing pins through the bores 26 in the fixing disk, but simply by further hooks of the type according to the disclosure, which can lead to a further force-distributing function onto the hollow wall.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Wall hook, fastening element
2 Cavity wall (gypsum plaster wall)

3 Hole (drill hole or punched hole)
4 Sleeve
10 Pointed end
A section
B section
C section
D section
E section
F section
20 Fixing disk
21, 22 Slots
23, 24 Angled slots
25 Centered hole in the fixing disk
26 Bores in the fixing disk

What is claimed is:

1. A wall fastening for a hollow wall, the wall fastening comprising:
   a first section forming a hook configured to remain in front of the hollow wall, the first section having a first portion and a second portion, the hook being formed between the first and second portions of the first section, the second portion of the first section extending in a first direction in a final installation position;
   a second section having a first portion, a second portion, and an extension portion between the first and second portions of the second section, the first portion of the second section being integral with the second portion of the first section, the extension portion of the second section being configured to extend through a bore in the hollow wall in the final installation position, and to extend in a second direction substantially perpendicular to the first direction and to a plane formed by the hollow wall in the final installation position; and
   a third section having a first portion, a second portion, and a curved portion between the first and second portions of the third section, the first portion of the third section being integral with the second portion of the second section, the second portion of the third section being configured to be inserted through the bore in the hollow wall during installation and to press against a rear side of the hollow wall in the final installation position at a lateral distance from the first portion of the third section, the curved portion being configured to bend away from the first portion of the third section at a first curvature and then bend toward the second portion of the third section at a second curvature such that, after insertion through the bore, the curved portion of the third section is configured to bend away from the first portion of the third section while the second portion of the third section presses against the rear side of the hollow wall in the final installation position.

2. The wall fastening as claimed in claim 1, wherein the first portion of the first section is configured to extend in the first direction in the final installation position, and
   wherein the first portion of the third section is configured to extend in the first direction in the final installation position.

3. The wall fastening as claimed in claim 2, wherein the first direction is substantially co-planar with at least one of a front side of the hollow wall and the rear side of the hollow wall.

4. The wall fastening as claimed in claim 1, wherein the second portion of the third section is configured to press against the rear side of the hollow wall in the final installation position at a tip formed at an end of the second portion of the third section.

5. The wall fastening as claimed in claim 4, wherein the tip at the end of the second portion of the third section is configured to at least partially carve into the rear side of the hollow wall in a position-fixing manner.

6. The wall fastening as claimed in claim 4, wherein, in the final installation position, the extension portion of the second section is substantially coplanar with the tip at the end of the second portion of the third section pressed against the rear side of the hollow wall.

7. The wall fastening as claimed in claim 1, wherein, in the final installation position, the extension portion of the second section is substantially coplanar with the second portion of the third section pressed against the rear side of the hollow wall.

8. The wall fastening as claimed in claim 1, wherein the third section, in the final installation position, is configured to exert an elastic restoring force on the first section.

9. The wall fastening as claimed in claim 1, wherein the third section, in the final installation position, produces a clamping tilting moment against the wall fastening by linear displacement of the hook, which keeps the hook under tension in the final installation position of the hook in relation to the third section.

10. The wall fastening as claimed in claim 1, wherein the first curvature bends at an angle of approximately 42° with respect to the first portion of the third section located before the first curvature,
    wherein the first curvature merges with the second curvature,
    wherein the second curvature bends at an angle of approximately 130°, and
    wherein the second portion of the third section has an opposed bend in a plane of projection, such that limbs of an enclosed angle describe an angle of approximately 153°.

11. The wall fastening as claimed in claim 1, comprising:
    a support structure in the first section, the support structure being arranged behind the hook and against the hollow wall from the front of the hollow wall.

12. The wall fastening as claimed in claim 1, comprising:
    a sleeve which is insertable into the bore in the hollow wall and through which the hook is pushable by the third section of the hook and which is to be held in the final installation position.

13. The wall fastening as claimed in claim 12, wherein the sleeve has a defined wall thickness such that load absorption forces of the wall fastening, which has been brought into the final installation position, will be distributed over an outer circumferential surface of the sleeve.

14. The wall fastening as claimed in claim 12, comprising:
    a thread on the outer circumferential surface of the sleeve, which is self-cutting by rotation into the bore of the hollow wall about a longitudinal axis of the sleeve and/or with a cutting fixing structure arranged on a side of the hook.

15. The wall fastening as claimed in claim 1, comprising:
    a threaded section, which is configured at the front end of the first section in such a manner that a fastening flange or a fastening element is screwable onto the threaded section.

16. The wall fastening as claimed in claim 1, wherein the third section forms a rear wall element, and the wall fastening has at least two expanding rear wall elements, of which at least one is elastically deformable.

17. The wall fastening as claimed in claim 1, comprising:
at least two wall fastenings fastenable in a manner lying next to one another by means of a fixing disk placeable onto the hollow wall,
wherein the wall hooks are pushable through slots in the fixing disk,
wherein each of the slots is offset from an edge or a side line of the fixing disk parallel to a center line or to a diameter line of the fixing disk in such a manner that, by rotation of the fixing disk, the wall fastenings will be braced toward one another.

18. The wall fastening as claimed in claim 17, wherein a length of the slots is smaller than half a diameter or half an edge length of the fixing disk.

19. The wall fastening as claimed in claim 18, comprising:
at least two slots in the fixing disk, each of the at least two slots having at least one further slot section which branches off approximately perpendicularly to the slot and ends within a surface of the fixing disk.

20. The wall fastening as claimed in claim 19, comprising:
at least two parallel, branching slot sections in each of the at least two slots.

21. The wall fastening as claimed in claim 17, comprising:
additional bores in the fixing disk for receiving pins fixing a rotational position, or further wall or ceiling hooks.

22. The wall fastening as claimed in claim 1, wherein the wall fastening is a wall hook, a ceiling hook, or an eyelet.

* * * * *